United States Patent Office 3,334,997
Patented Aug. 8, 1967

3,334,997
BERYLLIUM-MAGNESIUM ALLOY
Roger Caillat, Sevres, Raymond Darras, Versailles, Daniel Leclercq, Grenoble, Marc Salesse, Gif-sur-Yvette, and Pierre Vachet, Meudon, France, assignors to Commissariat à l'Energie Atomique et Compagnie de Produits Chimiques et Electrometallurgiques (Pechiney), Paris, France
No Drawing. Filed Dec. 27, 1965, Ser. No. 516,759
Claims priority, application France, Mar. 14, 1963, 928,034
1 Claim. (Cl. 75—150)

This application is a continuation-in-part of our co-pending application Ser. No. 351,508, filed Mar. 12, 1964, for Beryllium-Magnesium Alloy, which application is now abandoned.

The present invention relates to a beryllium-magnesium alloy which can be employed as a structural material or as a material for cladding fuel elements in nuclear reactors and which offers good oxidation resistance to dry or moist pressurized carbon dioxide gas and at high temperature.

The low neutron-capture cross-section of beryllium makes its use very attractive as a material for cladding fuel elements in nuclear reactors, and especially reactors which are cooled by pressurized carbon dioxide gas. Above 600° C., however, unalloyed beryllium has a low oxidation resistance to carbon dioxide gas which always contains a certain proportion of water vapor of the order of several tens to several hundreds of v.p.m. (volumes per million), as may be the case in nuclear reactors. At a temperature which is equal to or higher than 600° C. at 60 atmospheres' pressure, beryllium undergoes a breakaway process which is characterized by an accelerating rate of oxidation. There is observed at the same time an intergranular corrosion and even a marked swelling of the metal. At equal water vapor content, this process become progressively more marked as the pressure of the gaseous atmosphere increases since the partial pressure of water vapor increases at the same time as the total pressure. Moreover, even in dry carbon dioxide gas ($H_2O \leqslant 5$ v.p.m.) at a pressure of 60 atmospheres, breakaway appears in the vicinity of 700° C.

A number of solutions have been put forward with the object of increasing the oxidation resistance of beryllium. It has been observed that, by enriching beryllium with oxide at the grain boundaries (2% BeO, for example), its resistance to oxidation in moist $CO_2$ is increased to a certain extent. However, its power of deformation when subjected to mechanical stresses is too low to warrant serious consideration being given to its use either as a structural material or cladding material in a nuclear reactor.

Among the beryllium alloys which have been developed, the calcium-beryllium alloys have shown satisfactory behavior in moist carbon dioxide gas. However, calcium has a high neutron-capture cross-section, which is a disadvantage in the fabrication of cladding materials for nuclear fuels.

The present invention relates to a binary beryllium alloy in which the addition element has a low capture cross-section, said alloy having high oxidation resistance in either dry or moist pressurized carbon dioxide gas and at high temperature.

The beryllium alloy in accordance with the invention is essentially characterized in that it contains 0.1 to 0.5% by weight of magnesium, a magnesium content of 0.2% being sufficient to provide said alloy with suitable oxidation resistance and a very low content of other impurities other than magnesium.

A comparative study of the following materials has been carried out: commercial beryllium, beryllium containing 2% BeO, a beryllium-calcium alloy containing 0.2% calcium, a beryllium-magnesium alloy containing 0.2% magnesium prepared by casting, a beryllium-magnesium alloy containing 0.5% magnesium prepared by sintering process. The average weight gain of these different materials as expressed in mg./cm.² has been determined after periods of exposure of 1,000 hours and 7,000 hours at 650° C., 700° C. and 750° C. in a $CO_2$ atmosphere containing 50 and 100 v.p.m. of water vapor at a pressure of 60 atmospheres. The results obtained are recorded in the following table:

|  | Temperature | | | | | |
|---|---|---|---|---|---|---|
|  | 650° C | 700° C. | | | | 750° C. |
|  | Water vapor content of $CO_2$ | | | | | |
|  | 100 v.p.m. (1,000 hours) | 50 v.p.m. | | 100 v.p.m. | | 50 v.p.m. (1,000 hours) |
|  |  | 1,000 hours | 7,000 hours | 1,000 hours | 7,000 hours |  |
| Unalloyed commercial beryllium (sintered or cast) | >10 | >10 |  | >100 |  | >100 |
| Beryllium containing 2% BeO (sintered) | >10 | >10 |  | >10 |  |  |
| Beryllium-calcium alloy (cast) containing 0.2% Ca | 0.21 |  | 0.54 |  | 0.39 | 0.32 |
| Beryllium-calcium alloy (cast) containing 0.5% Ca | 0.23 |  | 0.58 |  | 0.48 | 0.31 |
| Beryllium-magnesium alloy (cast) containing 0.2% Mg | 0.08 |  | 0.60 |  | 0.22 | 0.38 |
| Beryllium-magnesium alloy (sintered) containing 0.5% Mg | 0.10 | 0.18 |  |  |  |  |

It is apparent from the above table that the beryllium-magnesium alloys containing 0.2% and 0.5% magnesium have a much higher oxidation resistance under the conditions which have been defined hereinabove than beryllium which is charged with oxide. The results which have been obtained from the beryllium-magnesium alloys compare favorably on the whole with the beryllium-calcium alloys.

The curves which show weight gains as a function of time continue to have a parabolic shape. The alloy does not show breakaway or intergranular corrosion even after several thousand hours' exposure at 750° C. The curves which relate to the beryllium-magnesium alloys having a magnesium content which ranges from 0.10 to 0.5% tend to reach a plateau in the vicinity of 0.3 to 0.4 mg./cm.² after 1,000 hours; the corresponding thickness of oxidized metal is very small since it is of the order of 1 micron.

It should also be noted that the mechanical properties of the alloys in accordance with the invention are usually superior to those of commercial beryllium. Thus, at a temperature of 600° C., the percentage elongation at fracture increases from 20 in the case of commercial beryllium to 30 in the case of beryllium-magnesium alloy containing 0.2% mg.

All the tests to which the results grouped in the above table refer have been carried out on beryllium in which the percentages of impurities as expressed in p.p.m. are as follows:

| | |
|---|---|
| Fe | 400 |
| C | 300 |
| Al | 200 |
| Si | 100 |
| Cr | 50 |

In "reactor grade beryllium" magnesium is one of the impurities present with a percentage of the same order than that of the other impurities. The beryllium base alloy according to the present invention has a very low content of impurities other than magnesium as appears from the following table:

| | Contents (p.p.m.) | | | |
|---|---|---|---|---|
| | Mg | Fe | Al | Si |
| Reactor grade Be | 3,000 | 2,000 | 1,500 | 700 |
| Be-Base alloy | 1,000 to 5,000 | 400 | 200 | 100 |

The alloy in accordance with the invention can be prepared either by sintering or by melting under a pressure of inert gas, and can be either rolled, extruded or drawn.

The excellent properties of the alloys in accordance with the invention, particularly as regards their resistance to oxidizing atmosphere, their low neutron capture cross-section, their good resistance to deformation make the use of said alloys particularly advantageous as cladding and structural materials in nuclear reactors of the carbon-dioxide gas cooled type.

What we claim is:

A beryllium base alloy consisting of beryllium and 0.2% to 0.5% by weight of magnesium, in which the contents of Fe, C, Al, Si and Cr are at most 400 p.p.m., 300 p.p.m., 200 p.p.m., 100 p.p.m. and 50 p.p.m., respectively.

References Cited

Reactor Handbook, vol. I, Interscience Publishers, Inc., New York, June 27, 1960, pages 897 and 898. TK 9209 R4.

L. DEWAYNE RUTLEDGE, *Primary Examiner.*

CARL D. QUARFORTH, *Examiner.*

R. L. GRUDZIECKI, *Assistant Examiner.*